Reissued Oct. 31, 1939 Re. 21,252

UNITED STATES PATENT OFFICE 21,252

METHOD OF MANUFACTURING ABRASIVE ARTICLES

Samuel S. Kistler, West Boylston, Mass., assignor to Norton Company, Worcester, Mass., a corporation of Massachusetts No Drawing. Original No. 2,150,121, dated March 7, 1939, Serial No. 90,952, July 16, 1936. Application for reissue September 14, 1939, Serial No. 294,949

4 Claims. (Cl. 51—278)

The invention relates to abrasive articles bonded with a synthetic resin or resinoid, for example grinding wheels, abrasive blocks and bricks, lapping wheels, regulating wheels, honing sticks and like articles formed of abrasive granular material together with a synthetic resin or resinoid bond.

One object of the invention is to provide a more economical method for the manufacture of the articles indicated. Another object of the invention is greatly to reduce the time heretofore required for curing the bond. Another object of the invention is to provide a method of manufacture of resinoid bonded abrasive articles which shall prevent swelling thereof. Another object of the invention is to provide a method of manufacture whereby products of more diversified types of structure may be produced. Another object of the invention is to provide a method of manufacture of abrasive articles of the class indicated containing a greater percentage of resinoid bond than has hitherto been practicable. Another object of the invention is to provide a superior grinding wheel for many specific uses. Another object of the invention is to provide a more durable grinding wheel of the type indicated. Other objects will be in part obvious or in part pointed out hereinafter.

The invention accordingly consists in the several steps and relation and order of each of said steps to one or more of the others thereof, all as will be illustratively described herein, and the scope of the application of which will be indicated in the following claims.

I provide a quantity of abrasive grain of any desired substance and grit size. For example, I may use fused alumina or silicon carbide, diamond grit commonly referred to as bort, garnet, quartz, corundum, emery or any other desired abrasive material. The invention applies to all sizes of abrasive granules or mixtures of different sizes thereof and also to mixtures of different kinds of abrasive material, if desired.

I provide a qualtity of resinoid bond. Such a bond may be of the phenol-aldehyde resin type, of the furfural resin type, or of the alkyd resin type.

Taking a suitable quantity of the abrasive grain, I mix with it a suitable quantity of a resinoid bond, the proportions being variable between wide limits as will hereinafter be more fully pointed out. I desire to form a coating of the resinoid upon each abrasive granule and accordingly preferably I provide either a quantity of the resinoid bond in liquid stage or alternatively a quantity of a suitable solvent, as furfural, benzaldehyde or one of the alcohols, and first wet the abrasive granules with such liquid or solvent in a mixing pan or the like, and thereafter introduce the balance of the resinoid in the form of powder and continue the mixing until the desired result of distributing the bond throughout the mass of abrasive granules, with some bond coating each granule, is achieved. However, so far as the broad aspects of my invention are concerned, I may proceed otherwise and, for example, the resinoid may be all of it in the powdered or dry stage and I may use a hot press to plasticize a mixture, mechanically produced, of abrasive granules and bond.

Having thus proceeded in any known or desired manner to produce a suitable mixture of abrasive grains and resinoid bond, I place, preferably a measured quantity thereof, in a suitable mold. I then apply pressure to the mold, desirably pressing to a predetermined volume, in order to produce an article which when cured is the final article, such as a grinding wheel or abrasive block or other desired shape.

I now remove the pressed article from the mold in the known manner. The article, for example the future grinding wheel, is now in what is called the "green" state, that is to say the pressure has changed the plastic mass into an object of form and shape which can be handled but which will possess much greater strength after it has been cured.

I now take the "green" article and place it in an autoclave or any other closed vessel by which pressure may be exerted upon the article. Preferably I heat the autoclave to that temperature which has been commonly employed to cure the particular synthetic resin or resinoid bond in the instant case. Or I may use a slightly different temperature but, for example, a preferred temperature for a typical phenol-formaldehyde resinoid bond is 175° C., which is 347° F. However, I apply pressure to the autoclave to exert a pressure upon the article being cured in the neighborhood of the saturated steam pressure for that particular temperature. The saturated steam pressure for a temperature of 175° C. is 129.4 lbs. per square inch absolute. For other temperatures the pressure of saturated steam may be readily determined from any steam table. However, on account of considerations which will be presently pointed out, I may use a pressure less than that of the saturated steam pressure at the maximum temperature.

Practically all of the heat curable synthetic resins, otherwise known as resinoids, as now commercially produced contain a substantial quantity of water. In some cases the quantity of water may be as low as 1% and in other cases there may be as much as 7 or 8% of water contained in the resin. It may, of course, be understood that a resin might be produced with even a considerably greater percentage of water therein, but manufacturers of synthetic risins have been careful to limit the amount of water to about the proportions indicated.

Besides containing water as thus indicated, heat curable synthetic resins also produce water by chemical reaction in the curing process. For example, in the case of phenol-formaldehyde, additional water produced by the reaction which takes place on curing I believe to amount to at least 1% by weight of the resin and possibly more. The result is that, in the case of phenol-formaldehyde resin, there is either present or produced water to the extent of generally at least 3% of the weight of the mass and in many cases more, which is either present or liberated during the curing process.

It has been customary to raise the temperature of heat curable synthetic resin abrasive products slowly to the maximum temperature. For example, it has been customary to use approximately fifty hours or in the neighborhood thereof to raise the temperature of phenol-formaldehyde products to the maximum, for example around 175° C., especially in the case of the larger articles, as otherwise the articles would be found to be swelled. I have found that the reason why swelling occurred in the past when it was attempted to cure too quickly and the reason why such a long period of time had to be employed in the manufacture of these products, is that they contain water and produce water by reaction as aforesaid and such water is converted into steam during the curing of the article which, as it occupies a vastly greater volume than the water, swells the article in attempting to escape.

This detrimental swelling on the one hand, the excessive length of time on the other hand, I am enabled to avoid by using the autoclave (or other closed chamber) having a pressure of the order of the saturated steam pressure at the maximum temperature or substantially less than such temperature. I may cure articles up to even the moderately large sizes in the short space of time of one and a half hours using such pressure. But by reason of the fact that, when the maximum temperature is reached, the resin has already set to a certain extent, I may use a pressure considerably under the saturated steam pressure for the highest temperature. As a specific example, using a maximum temperature of 175° C., in the case of a phenol-formaldehyde resin with any of the abrasive grains, I may raise the temperature in one and a half hours on any average or usual temperature curve, and use a pressure of only 95 lbs. absolute to the square inch. At 175° C. the vapor pressure of the water is 129.4 lbs. absolute to the square inch but the resin is, when the product reaches this temperature, strong enough to hold the water as such with the pressure of 95 lbs. per square inch absolute. That is to say, the partially cured resin itself appears to resist an internal pressure of 34.4 lbs. to the square inch or probably more, as there is a certain factor of safety in the procedure indicated. In the specific example the temperature was raised by heating the autoclave to approximately 175° C. in one-half hour, thereafter holding it at 175° C. for the balance of the curing time. Under such conditions, with a wheel 2½ inches thick, the interior of the wheel reaches 160° C. in about one hour and one quarter.

The effect of applying pressure to the article as it is cured, which pressure is either the saturated steam pressure at the momentary temperature or so close thereto that the strength of the partially cured resin accounts for the difference, is, I believe, to prevent the water from passing into steam at all, or at least in only a relatively small or negligible quantity, thus preventing the detrimental swelling which would otherwise take place were it attempted to cure the article in the short space of time specified.

Not only am I enabled greatly to shorten the time involved in curing synthetic resin bonded abrasive articles by the method of the invention, but I am also enabled to make new and different products thereby. For example, the normal limit of bond in an article of the type described in actual practical commercial use has been in the neighborhood of 28% of bond by volume. With the method of the present invention, however, I may make an article of the type indicated with any amount of bond by percentage. I am enabled to do this because, in such dense structures, I avoid swelling by positively preventing the formation of steam which cannot ordinarily escape without swelling or cracking a very dense structure having substantially more than 28% of resinoid.

Such dense abrasive wheels have particular utility in connection with the grinding of very tough materials, as for example stainless steel. Dense wheels made with more than 28% of bond may be made tougher and more durable and non-porous. The so-called "grade hardness" of such wheels may be extremely high.

It should be understood that in the case of very heavy, large or thick articles, a length of time greater than one and one-half hours may be used. It takes some time for the heat to penetrate by conduction into the interior of the article. I may in some cases raise the temperature slightly above that which has heretofore been used for the same type of resin, thereby reducing the total amount of curing time, as swelling due to generation of steam is, according to the invention, prevented with the pressures employed, as indicated. In certain cases the time employed in curing the product may be even less than one and one-half hours, but I have achieved good results in actual practice curing for an hour and a half at 95 lbs. per square inch absolute and at a temperature of 175° C., in the case of wheels 2½ inches thick, 16 inches in diameter. These wheels were made from fused alumina abrasive grain of grit size consisting of mixtures of 10, 12, 14 and 16, with phenol-formaldehyde resin, the grain having first been mixed with the liquid stage resin in a mixer, thereafter powdered stage resin having been added. This is given as an illustrative specific example and wide variations may be made in the type of resin used, the abrasive grain employed, the methods of mixing abrasive grain and bond, and otherwise as heretofore indicated.

If the article in a "green" state is introduced into an autoclave which is already at a temperature of approximately 175° C., there is nevertheless an appreciable time interval required to bring the article, especially a thick article, to a temperature at which the saturated steam pressure is 95 lbs. per square inch absolute, or approximately 80 lbs. gauge. This temperature is 162° C. and when the article or any part of it reaches this temperature, it has already been cured to some extent. With a pressure of 80 lbs. gauge, there is at this time a substantial balancing of pressures and, as the temperature rises, the curing proceeds and I have found in actual practice that a wheel of the size above indicated can be cured in this manner without detrimental swelling. I may use very much higher pressures than those indicated but, so far as I now know, with no added results.

The invention may be carried out with any type of autoclave or closed container which can be heated and subjected to pressure. A convenient way of heating an autoclave is to incorporate a steam plate therein. The pressure referred to is desirably air pressure but I am not limited thereto as pressure of any suitable gas or even liquid may be employed so far as this invention is concerned.

I have referred to the use of pressure, but it will be understood that a varying pressure may be used, if desired, and the maximum pressure may be exerted only when the maximum temperature is attained. However, for convenience, a constant pressure may be employed.

Insomuch as the regular commercial practice has been to employ a curing time of the order of fifty hours or more, some of the advantages of the invention may be achieved, so far as economy and speed of production are concerned, using a curing time of, for example twenty hours. In such event the pressure may be substantially less than 80 lbs. gauge. This is because the resin, when cured, possesses great strength to resist internal pressures.

It will thus be seen that there has been provided by this invention a method in which the various objects hereinabove set forth together with many thoroughly practical advantages are successfully achieved. As the art herein described might be varied in various parts, all without departing from the scope of the invention, it is to be understood that all matter hereinbefore set forth is to be interpreted as illustrative and not in a limiting sense.

I claim:

1. In the art of manufacturing abrasive articles from abrasive grain and a synthetic resin bond, the steps of taking a quantity of abrasive grain, adding a liquid plasticizer, adding a synthetic resin bond in powdered form, mixing thoroughly to produce a plasticized mass, taking a quantity of such mass and pressing it in a mold, pressing the mixture in the mold under substantial pressure but in a cold state, stripping the mold, placing the pressed article in an autoclave, applying to the autoclave a pressure of 80 pounds gauge, heating the autoclave to 175° C. in substantially one-half hour, thereafter maintaining the temperature for an hour additional in the autoclave under the said pressure of 80 pounds gauge.

2. In the art of manufacturing abrasive articles from abrasive grain and a synthetic resin bond, the steps of taking a quantity of abrasive grain, adding a liquid plasticizer, adding a synthetic resin bond in powdered form, mixing thoroughly to produce a plasticized mass, taking a quantity of such mass and pressing it in a mold, pressing the mixture in the mold under substantial pressure but in a cold state, stripping the mold, placing the pressed article in an autoclave, applying to the autoclave a pressure of eighty pounds gauge, heating the autoclave to above 150° C. within two hours, thereafter maintaining the temperature for an hour additional in the autoclave under the said pressure of eighty pounds gauge.

3. In the art of manufacturing abrasive articles from abrasive grain and a synthetic resin bond, the steps of taking a quantity of abrasive grain, adding a liquid plasticizer, adding a synthetic resin bond in powdered form, mixing thoroughly to produce a plasticized mass, taking a quantity of such mass and placing it in a mold, pressing the mixture in the mold under substantial pressure but in a cold state, stripping the mold, placing the pressed article in an autoclave, applying to the autoclave a pressure of 80 pounds gauge or above, heating the autoclave to 175° C. in substantially one-half hour, thereafter maintaining the temperature for an hour additional in the autoclave under the said pressure of 80 pounds gauge or above.

4. In the art of manufacturing abrasive articles from abrasive grain and a synthetic resin bond, the steps of taking a quantity of abrasive grain, adding a liquid plasticizer, adding a synthetic resin bond in powdered form, mixing thoroughly to produce a plasticized mass, taking a quantity of such mass pressing it in a mold, pressing the mixture in the mold under substantial pressure but in a cold state, stripping the mold, placing the pressed article in an autoclave, applying to the autoclave a pressure of eighty pounds gauge or above, heating the autoclave to above 150° C. within two hours, thereafter maintaining the temperature for an hour additional in the autoclave under the said pressure of eighty pounds gauge or above.

SAMUEL S. KISTLER.